Oct. 25, 1949.　　B. D. McINTYRE ET AL　　2,486,048
VEHICLE SEAT CONSTRUCTION
Filed Dec. 11, 1944　　　　　　　　　　　　　　4 Sheets-Sheet 1
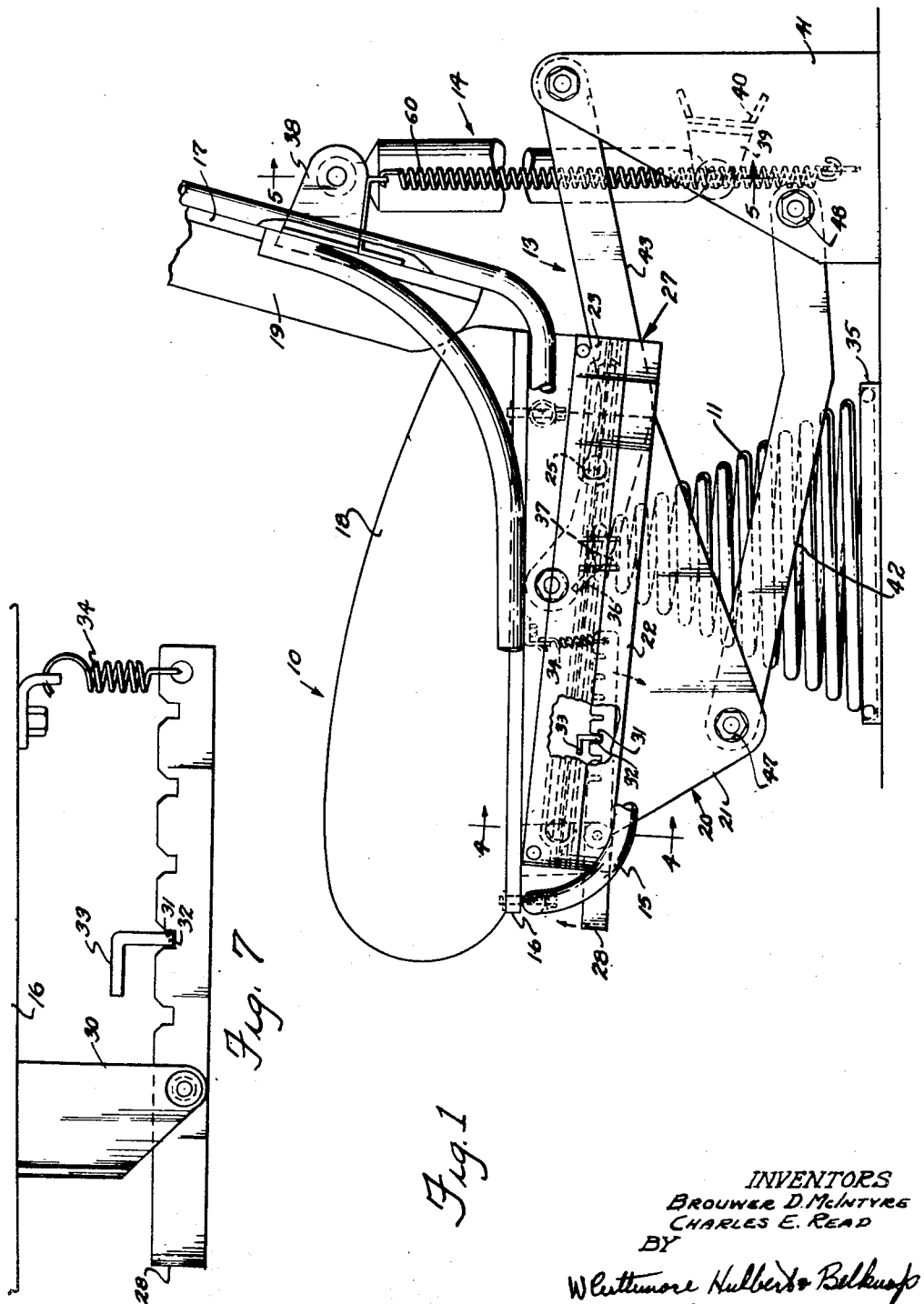
INVENTORS
BROUWER D. McINTYRE
CHARLES E. READ
BY
Whittemore Hulbert & Belknap
ATTORNEYS Oct. 25, 1949.	B. D. McINTYRE ET AL	2,486,048
VEHICLE SEAT CONSTRUCTION Filed Dec. 11, 1944	4 Sheets-Sheet 2

INVENTORS
BROUWER D. McINTYRE
BY CHARLES E. READ

Whittemore Hulbert & Belknap
ATTORNEYS

INVENTORS
BROUWER D. McINTYRE
CHARLES E. READ
BY
Whittemore Hulbert & Belknap
ATTORNEYS Patented Oct. 25, 1949

2,486,048

UNITED STATES PATENT OFFICE 2,486,048

VEHICLE SEAT CONSTRUCTION

Brouwer D. McIntyre and Charles E. Read, Monroe, Mich., assignors to Monroe Auto Equipment Company, Monroe, Mich., a corporation of Michigan Application December 11, 1944, Serial No. 567,645

3 Claims. (Cl. 155—9)

This invention relates generally to vehicle seats and refers more particularly to improvements in the mounting for vehicle seats.

It has been proposed to support vehicle seats on the flooring or other structure of a vehicle body by an assembly having spring means arranged to prevent the direct transmission of shocks to the seat proper and also having shock absorbing means for damping or diminishing succeeding motion of the seat caused by stored energy in the spring means. This general type of seat mounting provides improved riding qualities for the occupants of the seat irrespective of whether the vehicle is equipped with the usual chassis suspension system and regardless of the particular type of chassis suspension provided.

With the above in view the present invention contemplates a vehicle seat construction embodying a mounting of the above general type and capable of adjustment fore and aft of the vehicle without interfering with the operation of either the spring means or the shock absorber for the spring means.

Another object of this invention is to provide a vehicle seat construction wherein the spring means is in the form of variable rate coil springs located beneath the seat and wherein the shock absorbing means comprises a hydraulic direct acting tubular type shock absorber positioned at the rear of the seat. Coil springs of the variable rate variety are preferred because these springs are capable of being collapsed into a space hardly greater in height than the diameter or thickness of one of the coils of the spring with the result that they permit the required vertical travel of the seat in cases where there is a definite limit on the elevation of the seat with respect to the vehicle body flooring. The location of the shock absorber at the rear of the seat is advantageous in that it enables obtaining a wide range of shock absorber travel regardless of the vertical clearance provided between the seat and the vehicle body flooring.

A further object of this invention is to provide a vehicle seat construction of the type previously referred to having means beneath the seat for guiding vertical movement of the seat in a substantially straight line path of travel. In the present instance the means aforesaid comprises two pairs of links respectively positioned adjacent opposite sides of the seat and having the opposite ends respectively pivotally connected to the seat assembly and to a fixed part of the vehicle.

In addition to the foregoing the present invention contemplates means for resisting angular or tipping motion of the seat resulting from alternate deflection of the ground engaging wheels at opposite sides of the vehicle and for also maintaining the seat on a substantially even keel regardless of the load distribution on opposite side portions of the seat. In accordance with this invention corresponding ends of the links are connected by torsion tubes having a torsional characteristic predetermined to accomplish both of the above results.

The foregoing as well as other objects will be made more apparent as this description proceeds, especially when considered in connection with the accompanying drawings, wherein:

Figure 1 is a side elevation of a vehicle seat constructed in accordance with this invention;

Figure 7 is a sectional view taken on the line 7—7 of Figure 3.

Figure 6:
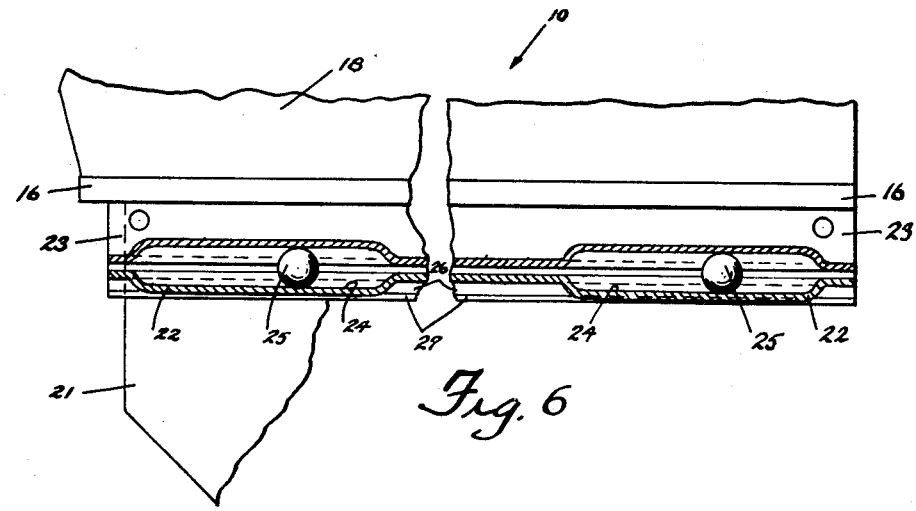
Figure 6 is a sectional view taken on the line 6—6 of Figure 4.

Referring now more in detail to the drawings it will be noted that the reference character 10 indicates a vehicle body seat assembly, 11 designates spring means for supporting the seat above the flooring 12 of the vehicle body, 13 indicates means for stabilizing and guiding vertical movement of the seat, and 14 designates a hydraulic shock absorber for damping or diminishing succeeding motion of the seat caused by stored energy in the spring means.

The vehicle seat 10 selected for the purpose of illustration is a relatively wide seat having a tubular type frame 15 of conventional design. It will suffice to point out that the frame 15 has a forwardly projecting portion for supporting the base 16 of the seat and has an upwardly projecting portion for supporting the back 17 of the seat. A seat cushion 18 is mounted on the base 16 and a back cushion 19 is suitably fixed to the back 17 of the seat.

Figure 4:
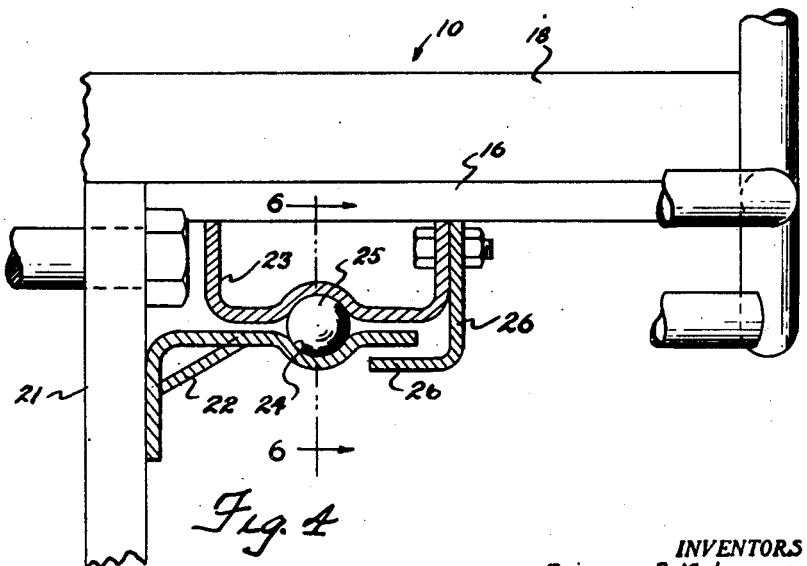
Figure 4 is a sectional view taken on the line 4—4 of Figure 1.

The seat proper is carried by a frame 20 for sliding movement fore and aft of the vehicle body. The frame 20 comprises a pair of vertical plates 21 positioned beneath the base portion 16 of the seat adjacent opposite sides of the latter. As shown in Figure 4 of the drawings a track 22 is secured to the outer side of each plate 21 adjacent the top of the latter and extends in a direction fore and aft of the vehicle body. Cooperating tracks 23 are secured to the base portion 16 of the seat 10 and respectively assume positions directly above the tracks 22. Referring now to Figure 6 of the drawings it will be noted that longitudinally spaced registering portions of adjacent tracks are formed to provide elongated recesses 24 substantially semi-circular in cross-section and adapted to form a retainer for suitable balls 25. The diameter of the balls 25 is such as to support the tracks 23 in vertical spaced relation to the tracks 22 and thereby enable movement of the seat 10 along the tracks 22 with the minimum amount of friction. The weight of the seat assembly 10 is sufficient to hold the latter on the tracks 22 and accidental disengagement of the tracks in an upward direction is prevented by retainers 26 respectively secured to the outersides of the tracks 23 and having inwardly projecting flanges 26' extending beneath the marginal edges of the tracks 22.

The seat assembly 10 is held in any one of a number of positions of adjustment by means of a U-shaped frame 27 supported midway between the plates 21 with the base portion 28 positioned at the front side of the seat and forming a handle capable of being conveniently manipulated by an occupant of the seat. The leg portions 29 of the frame project rearwardly beneath the base 16 of the seat and are pivotally connected intermediate the ends thereof to the seat brackets 30. The top edges of the leg portions 29 are formed with a plurality of slots 31 spaced from each other in the direction of length of the leg portions and selectively engaged by a finger 32. The finger 32 comprises an angle bar 33 extending between the plates 21 and having the opposite ends respectively secured to the plates. The rear ends of the leg portions 29 of the U-shaped frame are normally urged upwardly into operative relationship with the finger 32 by means of springs 34 having the opposite ends respectively connected to the free ends of the leg portions 29 and to the base 16 of the seat.

It follows from the above that when it is desired to adjust the seat 10 fore or aft of the vehicle body, the handle or base 28 of the U-shaped frame is swung in an upward direction against the action of the springs 34 to disengage the finger 32 from the slots 31 in the leg portions 29 of the frame 27. The seat assembly 10 may then be easily moved relative to the seat carrying frame 20 either forwardly or rearwardly to the desired position of adjustment. The handle or base portion 28 of the frame 27 is then released and the seat is shifted slightly to enable the finger 32 to engage in the adjacent slots 31.

The spring means 11 comprise a pair of coil springs respectively located adjacent opposite sides of the seat directly beneath the base portion 16 of the seat and between the plates 21. It will be noted that the coil springs are of the variable rate type characterized in that succeeding convolutions are adapted to nest one within the other upon deflection of the springs. This construction is advantageous in that it enables supporting the seat in relatively close proximity to the vehicle body floor 12 and at the same time provides ample clearance for the required vertical travel of the seat.

Figure 2:
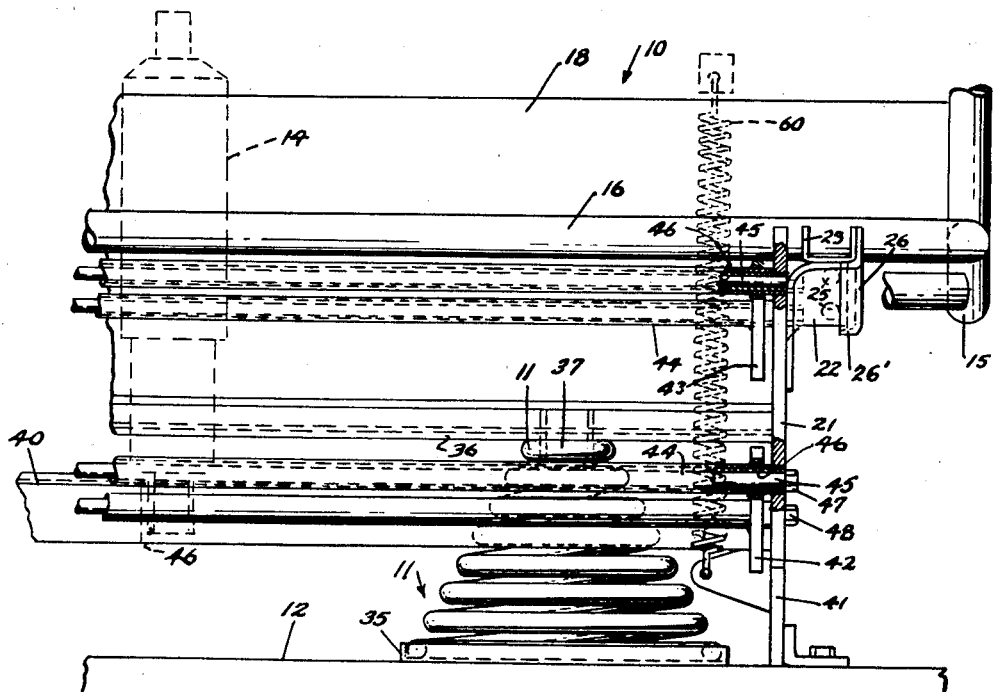
Figure 2 is a fragmentary front elevation of the seat shown in Figure 1.
Figure 3:
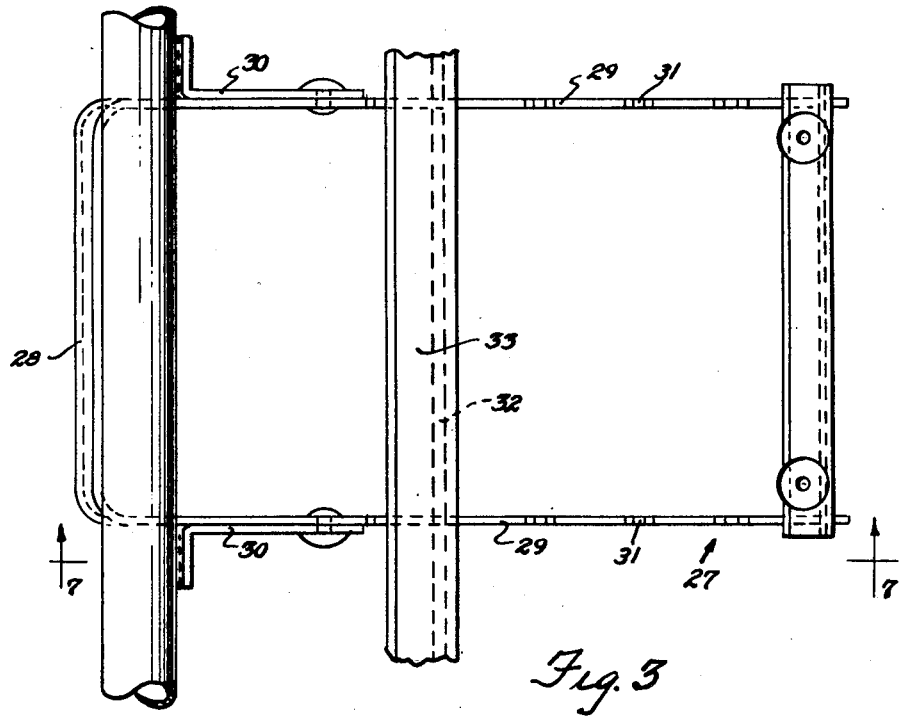
Figure 3 is a fragmentary top plan view of the seat construction shown in Figure 1.

Upon reference to Figures 1 and 2 of the drawings, it will be noted that the lowermost convolution of each coil spring is supported in a retainer 35, which in turn is secured to the flooring 12 of the vehicle body and the uppermost convolution of each spring engages an abutment 36. The abutment 36 is in the form of a bar which extends between the plates 21 and has the opposite ends respectively secured to the plates 21. Lateral shifting movement of the upper ends of the coil springs relative to the bar 36 is prevented by suitable projections 37 fixed to the bar 36 and respectively extending into the uppermost coil of the coil springs 11. Thus it will be noted that the coil springs yieldably support the seat assembly 10 in vertical spaced relation to the flooring 12 of the vehicle body and thereby cushion shocks transmitted to the seat assembly.

The action of the coil springs 11 is controlled by the shock absorber 14. In the interest of simplicity and economy in manufacture only one shock absorber is positioned at the rear of the seat 10 intermediate opposite sides of the latter and is of the tubular, direct acting type. As shown particularly in Figure 1 of the drawings, the shock absorber 14 is supported with its axis extending substantially vertically and the opposite ends of the shock absorber are respectively connected to the vehicle body flooring 12 and to the back 17 of the seat assembly 10. In detail the upper end of the shock absorber is pivotally connected to the back 17 of the seat midway between opposite sides of the latter by means of a bracket 38. The lower end of the shock absorber, on the other hand, is pivoted to a bracket 39 which, in turn, is secured to a bar 40 having the opposite ends respectively secured to a pair of plates 41. The plates 41 are respectively arranged in a common vertical plane with the plates 21 and are welded or otherwise secured to the flooring 12 of the vehicle body. As will be more fully hereinafter set forth, the shock absorber 14 is constructed to dampen the recoil action of the coil springs 11.

The combined guiding and stabilizing means 13 comprises two pairs of links 42 and 43, respectively positioned adjacent opposite sides of the seat beneath the base portion 16 of the seat. The front ends of the links 42 and 43 are respectively pivotally connected to the plates 21 in vertical spaced relationship and the rear ends of the links are respectively pivotally connected to the plates 41 in corresponding vertical relationship. The construction is such as to guide vertical movement of the seat in a substantially straight line path of travel.

Upon reference to Figure 2 of the drawings, it will be noted that the corresponding ends of the links of each pair are connected together by torsion tubes 44 respectively journaled on rods 45 by means of tubular members 46 carried on the opposite ends of the rods. The rods 45 associated with the front ends of the links are secured to the plates 21 by nuts 47 and the rods 45 associated with the rear ends of the links are secured to the plates 41 by similar nuts 48. The bearings 46 are supported on the rods and extend through the ends of the links into the adjacent ends of the tubes 44 so as to rotatably support the tubes 44 on the rods. The corresponding ends of the links are respectively welded or otherwise permanently secured to opposite ends of the tubes 44 so as to enable pivotal movement of the links with the torsion tubes 44.

The torsional characteristics of the tubes 44 are predetermined so that these tubes will twist or deform within their elastic limits when movement of either ground engaging wheel at one side of the vehicle is different from the movement of the ground engaging wheels at the opposite side of the vehicle. This torsional deformation of the tubes is advantageous in that it restricts tipping or angular motion of the vehicle body seat in the event the ground engaging wheels at opposite sides of the vehicle alternately pass over bumps or obstructions on the road surface. It should be noted, however, that while elastic torsional deformation of the tubes is provided for, nevertheless, the tubes are sufficiently rigid to coact with the links to maintain the seat 10 on a substantially even keel when the load on one side of the seat exceeds the load on the opposite side thereof. In other words, any force tending to move one side of the seat downwardly to a greater extent than the opposite side will be transferred to the latter side through the torsion tubes, tending to effect uniform movement of both sides of the seat. This feature is high advantageous in the present instance where the seat is of sufficient width to support two or more occupants.

Figure 5:
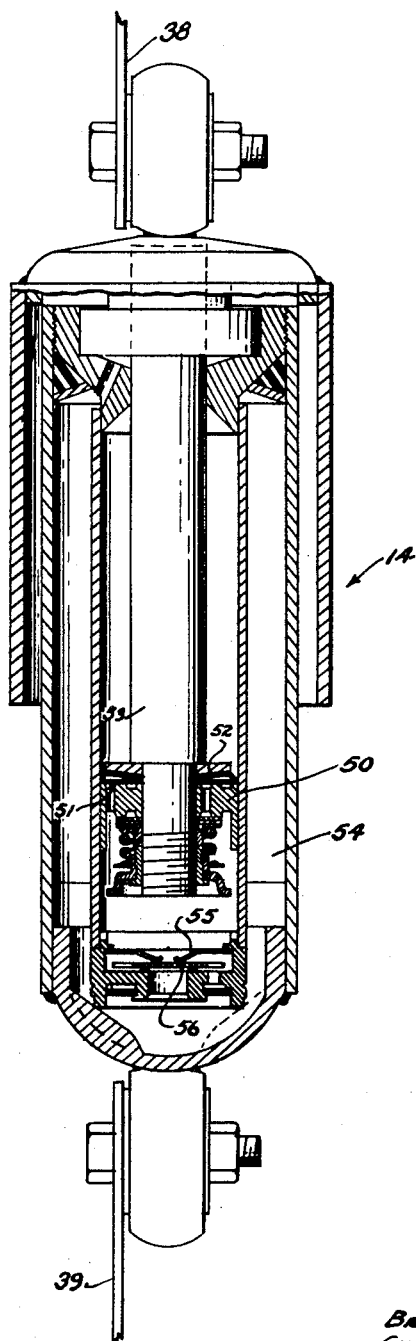
Figure 5 is a sectional view taken on the line 5—5 of Figure 1.

The shock absorber selected for the purpose of illustrating this invention is shown in Figure 5 of the drawings. It will be noted from this figure that the flow of fluid downwardly through the piston 50 is restricted by a strong pressure relief valve 51 and the flow of fluid upwardly is controlled by a relatively weak check valve 52. Also, due to the fact that the plunger 53 carrying the piston 50 moves into and out of the shock absorber cylinder, it is necessary to compensate for the displacement of the plunger. For this purpose, the lower end of the cylinder communicates with a reserve chamber 54 through a valve 55 having a check valve 56 permitting relatively free flow of fluid from the reserve chamber to the cylinder to replenish the fluid in the latter upon upward movement of the piston and having a pressure relief valve 56 permitting more restricted flow of fluid from the cylinder to the reserve chamber upon downward movement of the piston in the shock absorber cylinder. Thus it will be noted that the valve associated with the piston and the valves controlling the reserve chamber cooperate to provide the desired damping action.

In order to prevent unrestricted upward movement of the seat 10 when the weight or load on the latter is relieved, a pair of springs 60 is provided. The springs 60 are respectively located adjacent opposite sides of the seat 10 and the upper ends of the springs are connected to the back 17 of the seat. The lower ends of the springs are respectively connected to the plates 41 with the result that these springs preload the coil springs 11 and maintain the seat 10 at the desired elevation when very little or no load is applied to the seat.

What we claim as our invention is:

1. A seat construction for vehicles having a supporting part, comprising a seat having a base portion and having a back portion extending upwardly from the base portion, means for supporting the seat above the vehicle supporting part including a variable rate conical coil spring positioned beneath the seat, a pair of members extending upwardly from the supporting part in spaced relation to each other in the direction of length of the seat and positioned beyond the back of the seat out of interference with vertical displacement of the seat, means for guiding movement of the seat in a substantially vertical path including vertically spaced links positioned at each side of the seat and having the front ends pivotally connected to the seat below the base portion thereof, said links projecting rearwardly beyond the back of the seat and having the rear ends respectively pivotally connected to the members, a tubular direct acting shock absorber positioned beyond the back portion of the seat with its axis extending substantially vertically and having the upper end connected to the back portion of the seat at a point spaced substantially above the base portion of the latter, and means operatively connecting the lower end of the shock absorber to the vehicle supporting part.

2. A seat construction for vehicles having a supporting part, comprising a seat having a base portion and a back portion, means mounting said seat for yielding up and down movement relative to the supporting part including a conical coil spring positioned beneath the base portion of the seat with the opposite ends respectively anchored on the seat and supporting part by means permitting shifting movement of the upper end of the spring laterally of the spring axis in response to any fore and aft shifting movement of the seat, means guiding up and down movement of the seat including links arranged in pairs at opposite sides of the seat beneath the base portion of the latter, means pivotally connecting corresponding ends of the links of each pair to the seat base, means for pivotally connecting opposite ends of the links to the vehicle supporting part at points spaced rearwardly beyond the seat back out of interference with vertical displacement of the seat, a tubular direct acting shock absorber positioned beyond the back portion of the seat with its axis extending substantially vertically and having the upper end thereof connected to the back portion of the seat at a point spaced substantially above the base portion of the latter, and means for operatively connecting the lower end of the shock absorber to the vehicle supporting part.

3. A seat construction for vehicles having a supporting part, a seat having a base portion and having a back portion, a conical coil spring positioned below the base portion of the seat for supporting the seat above the vehicle supporting part, a pair of upright members fixed to the supporting part rearwardly beyond the seat and spaced from each other lengthwise of the seat, a pair of substantially parallel vertically spaced tubes having the opposite ends respectively rotatably supported on the members, a second pair of vertically spaced tubes positioned beneath the seat base and extending parallel to each other and to the first pair of tubes, means for rotatably supporting the second pair of tubes on the seat base, links connecting opposite end portions of the uppermost tube in each pair and having the ends respectively rigidly secured to the said tubes, and links connecting the opposite end portions of the lowermost tube in each pair and having the ends respectively rigidly secured to the latter tubes, a tubular direct acting shock absorber positioned beyond the back portion of the seat with its axis extending substantially vertically and having the upper end thereof connected to the back portion of the seat at a point spaced substantially above the base portion of the latter, and means operatively connecting the lower end of the shock absorber to the vehicle supporting part.

BROUWER D. McINTYRE.
CHARLES E. READ.

REFERENCES CITED

The following references are of record in the file of this patent:

UNITED STATES PATENTS

| Number | Name | Date |
|---|---|---|
| 1,058,655 | Bates et al. | Apr. 8, 1913 |
| 1,929,023 | Hickman | Oct. 3, 1933 |
| 2,073,872 | Kliesrath | Mar. 16, 1937 |
| 2,149,946 | Whedon et al. | Mar. 7, 1939 |
| 2,213,004 | Hickman | Aug. 27, 1940 |
| 2,254,678 | Frise | Sept. 2, 1941 |
| 2,334,922 | Gustafson | Nov. 23, 1943 |
| 2,357,825 | Hickman et al. | Sept. 12, 1944 |
| 2,366,730 | Hickman | Jan. 9, 1945 |

FOREIGN PATENTS

| Number | Country | Date |
|---|---|---|
| 106,079 | Great Britain | Nov. 4, 1917 |
| 556,818 | France | Apr. 20, 1923 |
| 634,647 | Germany | Sept. 1, 1936 |